United States Patent [19]

Ho et al.

[11] Patent Number: 5,732,405
[45] Date of Patent: Mar. 24, 1998

[54] METHOD AND APPARATUS FOR PERFORMING A CACHE OPERATION IN A DATA PROCESSING SYSTEM

[75] Inventors: Yui Kaye Ho, Austin; William C. Moyer, Dripping Springs; Joseph A. Gutierrez, Austin, all of Tex.

[73] Assignee: Motorola, Inc., Schaumburg, Ill.

[21] Appl. No.: 336,702

[22] Filed: Nov. 8, 1994

Related U.S. Application Data

[63] Continuation of Ser. No. 955,818, Oct. 2, 1992, abandoned.

[51] Int. Cl.⁶ .................................................. G06F 12/04
[52] U.S. Cl. .................................................. 711/3; 711/209
[58] Field of Search .............................. 395/403, 412, 395/413, 416, 418, 419; 365/49; 711/3, 206, 207, 208, 209

[56] References Cited

U.S. PATENT DOCUMENTS

| | | | |
|---|---|---|---|
| 4,538,241 | 8/1985 | Levin et al. | 395/417 |
| 4,965,720 | 10/1990 | Mitchell et al. | 395/400 |
| 5,107,417 | 4/1992 | Yokoyama | 395/500 |
| 5,155,825 | 10/1992 | Moughanni et al. | 395/425 |
| 5,230,045 | 7/1993 | Sindhu | 395/425 |
| 5,233,700 | 8/1993 | Takagi | 395/400 |
| 5,263,140 | 11/1993 | Riordan | 395/417 |
| 5,412,787 | 5/1995 | Iorsyll et al. | 395/417 |

OTHER PUBLICATIONS

Motorola MC88200 Cache/Memory Management Unit User's Manual; 1989,1990; pp. iii through viii, 1-1 through 3-33.

*Primary Examiner*—Eddie P. Chan
*Assistant Examiner*—Hiep T. Nguyen
*Attorney, Agent, or Firm*—Susan C. Hill

[57] ABSTRACT

A method and apparatus for performing a cache operation in a data processing system (10). In one form, the present invention has a "block address translation cache (BATC) only mode" in which a received logical address is compared to the logical addresses stored in only one of a plurality of address translation caches, i.e. the block address translation cache (BATC) (76). The overhead associated with loading and comparing one or more other caches (78) is not incurred. If the comparison with that one cache (BATC) (76) produces a hit, that cache (BATC) (76) supplies the address that is used as the physical address. If the comparison with that one cache (BATC) (76) produces a miss, then a 1:1 mapping is used and the received logical address is used as the physical address.

21 Claims, 6 Drawing Sheets

| MMU ADDRESS TRANSLATION MODE | TO ACTIVATE | | | SOURCE OF ACCESS PROTECTION INFORMATION (SOURCE OF ATTRIBUTES) | MAPPING |
| --- | --- | --- | --- | --- | --- |
| | MMU ENABLE/DISABLE CONTROL BIT (MEN) | TRANSLATION ENABLE (TE) | VALID BATC ENTRY WITH ADDRESS MATCH (BATC HIT) | | |
| IDENTITY | 0 | DON'T CARE | DON'T CARE | CONTROL REGISTER | 1:1 |
| BATC ONLY | 1 | 0 | YES | BATC | BATC |
| | 1 | 0 | NO | CONTROL REGISTER | 1:1 |
| PATC ONLY | 1 | 1 | NO | PATC (OR TABLE SEARCH) | PATC (OR TABLE SEARCH) |
| BOTH BATC AND PATC | 1 | 1 | YES OR NO | BATC OR PATC (OR TABLE SEARCH) | BATC OR PATC (OR TABLE SEARCH) |

MMU (MEMORY MANAGEMENT UNIT)
BATC (BLOCK ADDRESS TRANSLATION CACHE)
PATC (PAGE ADDRESS TRANSLATION CACHE)

*FIG.5*

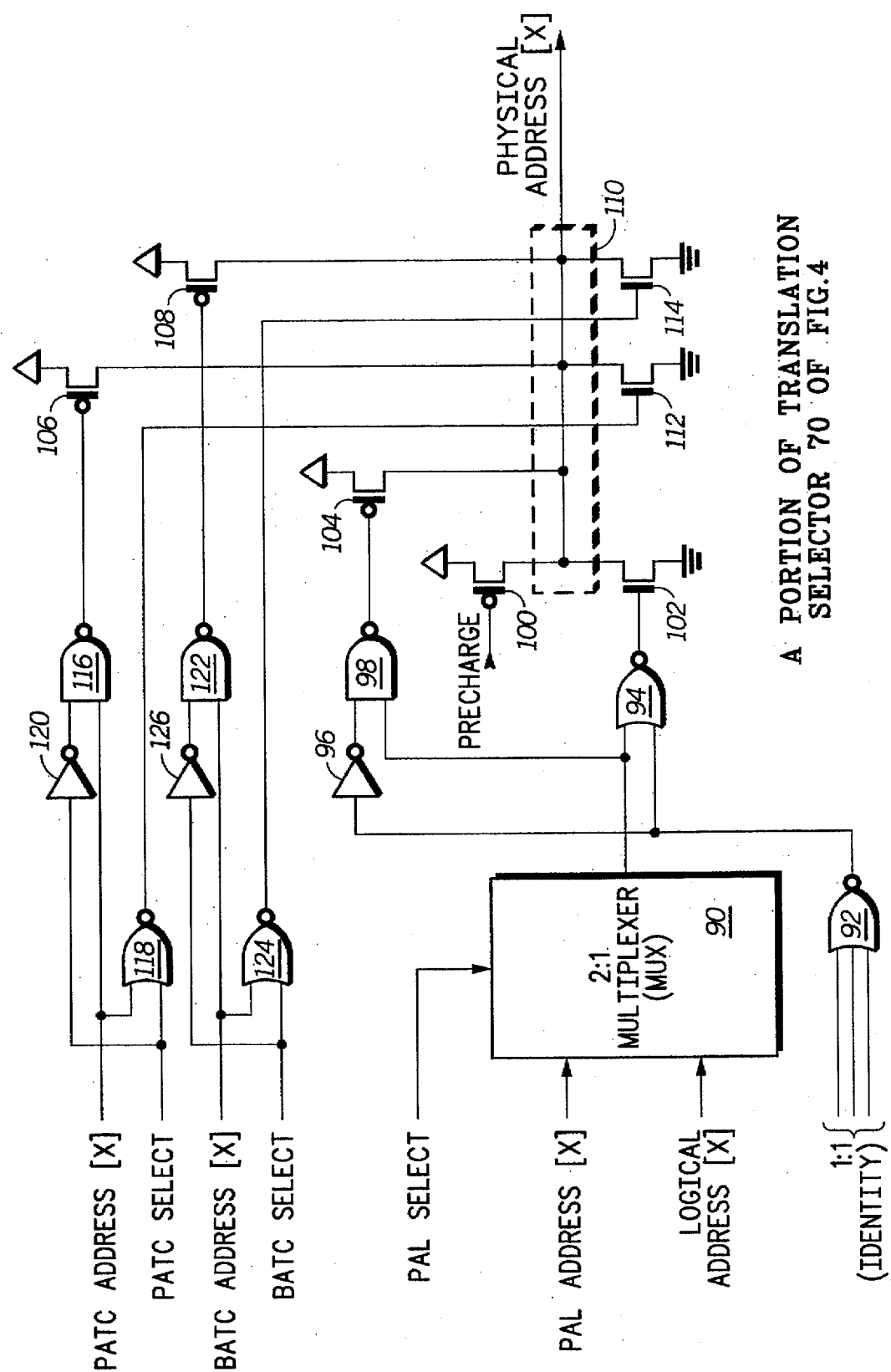

METHOD AND APPARATUS FOR PERFORMING A CACHE OPERATION IN A DATA PROCESSING SYSTEM

This application is a continuation of prior application Ser. No. 07/955,818, filed Oct. 2, 1992, now abandoned.

FIELD OF THE INVENTION

The present invention relates in general to a data processing system, and more particularly to a method and apparatus for performing a cache operation in a data processing system.

BACKGROUND OF THE INVENTION

Today's high performance data processing systems rely upon sophisticated memory management systems to translate logical addresses into real (physical) addresses. Logical addresses are the software addresses used by the programmer when writing software. Physical addresses are the hardware addresses used by the semiconductor chips and electronic circuitry running the software.

In a very simple microprocessor-based system, the central processing unit (CPU) is linked directly to memory. With this type of configuration, no memory mapping or task protection capabilities are provided, and the addresses generated by the CPU directly identify the physical locations to be accessed. This type of system, however, is unsuitable for multiple-task operations since there is no protection to prevent corruption of one task by another.

A memory unit with one or more address translation caches (ATCs) is often used to provide the address mapping and the task protection needed to construct a multitasking data processing system. The memory unit acts as an interface between the CPU and the physical memory. The memory unit controls all accesses to physical devices, and tasks can be prevented from accessing the resources owned by other tasks. When under the control of an operating system with virtual memory capabilities, the logical-to-physical mapping functions allow tasks to utilize the entire address space of the CPU without detailed knowledge of the physical characteristics of the system.

The logical address is generated by the CPU and received as an input by the memory unit. The memory unit, using one or more address translation caches, performs address translation and privilege checking for the logical address and, if the mapping is valid, drives the corresponding physical address to the data or instruction cache. Note that the corresponding physical address produced by an ATC may be used to access either data or an instruction, depending upon whether the ATC is part of a data memory unit or part of an instruction memory unit.

Generally, a memory unit contains one or more address translation caches which are used to perform address translation and privilege checking; and the memory unit also contains one or more caches which store actual data or instructions. Each entry in the address translation cache usually contains a logical address, a corresponding physical address, and one or more protection or control bits (collectively called attribute bits or attributes).

On each memory access, an incoming logical address is received by the memory unit and is compared to the logical address portion of each entry in the appropriate ATC in order to locate the requisite logical-to-physical mapping. When the ATC contains the requisite logical-to-physical mapping, a translation "hit" (also called a "match") occurs, and the ATC produces the corresponding physical address.

When the ATC does not contain the requisite logical-to-physical mapping, a translation "miss" (also called "no match") occurs, and a hardware state machine or a software routine is invoked to search memory more distant than the cache in order to determine the physical address that corresponds to the received logical address. This search is often called a "table search" or a "table walk" because it may require the data processing system to access and read more than one table stored in more distant memory.

The advantage of the address translation cache (ATC) is that it saves a great deal of time. Rather than having to access tables in distant memory every time a translation is required, the data processing system can quickly access the address translation cache and retrieve the correct physical address for certain selected logical addresses.

A cache/memory management unit on the MC88200, available from Motorola, Inc. of Austin, Tex., has a separate memory unit for instructions and a separate memory unit for data. Each of the two memory units (instruction and data) has address translation logic containing a page address translation cache (PATC) and a separate block address translation cache (BATC).

In the prior art MC88200, there are three available translation modes: identity mode, PATC only mode, and both PATC and BATC mode. First, in the identity mode, neither the PATC nor the BATC is searched for a match; the physical address is the same as the logical address. Second, in the PATC only mode, both the PATC and the BATC are searched for a match in order to determine the corresponding physical address. In the PATC only mode, the search of the BATC is wasted overhead and the user must load the BATC with values that will ensure that the BATC does not erroneously cause a hit.

Third, in the both PATC and BATC mode, both the PATC and the BATC are searched for a match in order to determine the corresponding physical address. The MC88200 has no mode in which only the BATC is searched. Note that if both the PATC and the BATC miss, a time consuming table search operation must be performed in order to determine the physical address that corresponds to the received logical address.

The BATC provides logical-to-physical address translation for 512K-byte blocks of memory. Normally these blocks contain the operating system kernel or other high-use software. Since these blocks are high-use blocks, caching address translation at the block level provides faster data cache access while avoiding ATC misses and their associated table searches. The PATC, on the other hand, provides logical-to-physical address translation for smaller 4K-byte pages of memory.

Some data processing system applications require large linear arrays of data. For example, a frame buffer for a color monitor may consist of a large linear array of data which corresponds to the pixels on the screen of the monitor. Such a frame buffer may be too large to use pages effectively. For example, a frame buffer for a particular color monitor may require as much as 4M-bytes of memory. Such a frame buffer would require one thousand pages if each page was 4K-bytes. As a result, pages would not be an effective way to handle this large of a frame buffer.

In addition, it is usually desirable for the software routines that operate on the frame buffers to be independent of the application's hardware configuration. As an example, a software routine which is used to modify a frame buffer is usually written so that the same software routine can be used in applications having different memory sizes and/or monitor types.

Thus for some applications, blocks are the most efficient way to handle large linear arrays of data such as frame buffers. In the prior art MC88200, the both PATC and BATC translation mode was the mode which was normally used to handle large frame buffers. Unfortunately, the both PATC and BATC mode requires the extra overhead of loading and checking the PATC even though only the BATC is required. Thus the software is required to properly load the PATC so that an erroneous hit does not occur. In addition, the hardware performs an unnecessary check by comparing the incoming logical address to each entry in the PATC.

SUMMARY OF THE INVENTION

The previously mentioned needs are fulfilled and other advantages achieved with the present invention. In one form, the present invention is a method and apparatus for performing a cache operation in a data processing system having a first cache.

In one embodiment, the method includes the step of receiving an incoming value as an input to the first cache. The method also includes the step of comparing the incoming value to a plurality of first values stored in the first cache. In addition, the method includes the step of determining that a first cache miss has occurred if the incoming value does not match any of the plurality of first values stored in the first cache. And finally, the method includes the step of transmitting the incoming value as an output value if the first cache miss has occurred.

The present invention will be understood by one skilled in the art from the detailed description below in conjunction with the accompanying drawings.

BRIEF DESCRIPTION OF THE DRAWINGS

FIG. 5 illustrates, in tabular form, four MMU address translation modes, how the modes are activated, the source of attribute bits for each mode, and the mapping for each mode in accordance with one embodiment of the present invention;

FIG. 7 illustrates, in partial block diagram form, partial logic diagram form, and partial schematic diagram form, a portion of translation selector 70 of FIG. 4 in accordance with one embodiment of the present invention.

DESCRIPTION OF THE PREFERRED EMBODIMENTS

A more efficient and more flexible approach to address translation was needed. A BATC only mode was developed in which only the BATC 76 is searched for a match. The BATC only mode was then incorporated into a new approach to address translation which allowed more flexibility to the system designer.

The new BATC only mode eliminates the extra overhead required for loading and checking the PATC 78 when only the BATC 76 is being used for address translation. Note that in the prior art PATC only mode, the unnecessary overhead to load and check the BATC 76 was still required.

In addition, in the new BATC only mode, a BATC miss defaults to a 1:1 mapping which is the same as the 1:1 mapping in identity mode. In 1:1 mapping, the physical address is the same as the logical address. The default to 1:1 mapping may be used in a variety of ways, thus allowing the system designer to have more flexibility.

For example, using the present invention the system designer may interleave fixed address locations which do not require address translation with mapped address location which do require address translation. The fixed address locations do not require an entry in the BATC 76. Thus, the fixed address locations will always produce a BATC miss and will always default to 1:1 mapping in which the physical address is the same as the logical address. The mapped address locations, on the other hand, do require an entry in the BATC 76. Thus, the mapped address locations will always produce a BATC hit in order to determine the corresponding physical address.

The present invention can be used in a wide variety of ways to improve the efficiency and flexibility of data processing systems utilizing address translation.

DESCRIPTION OF THE FIGURES

Figure 1:
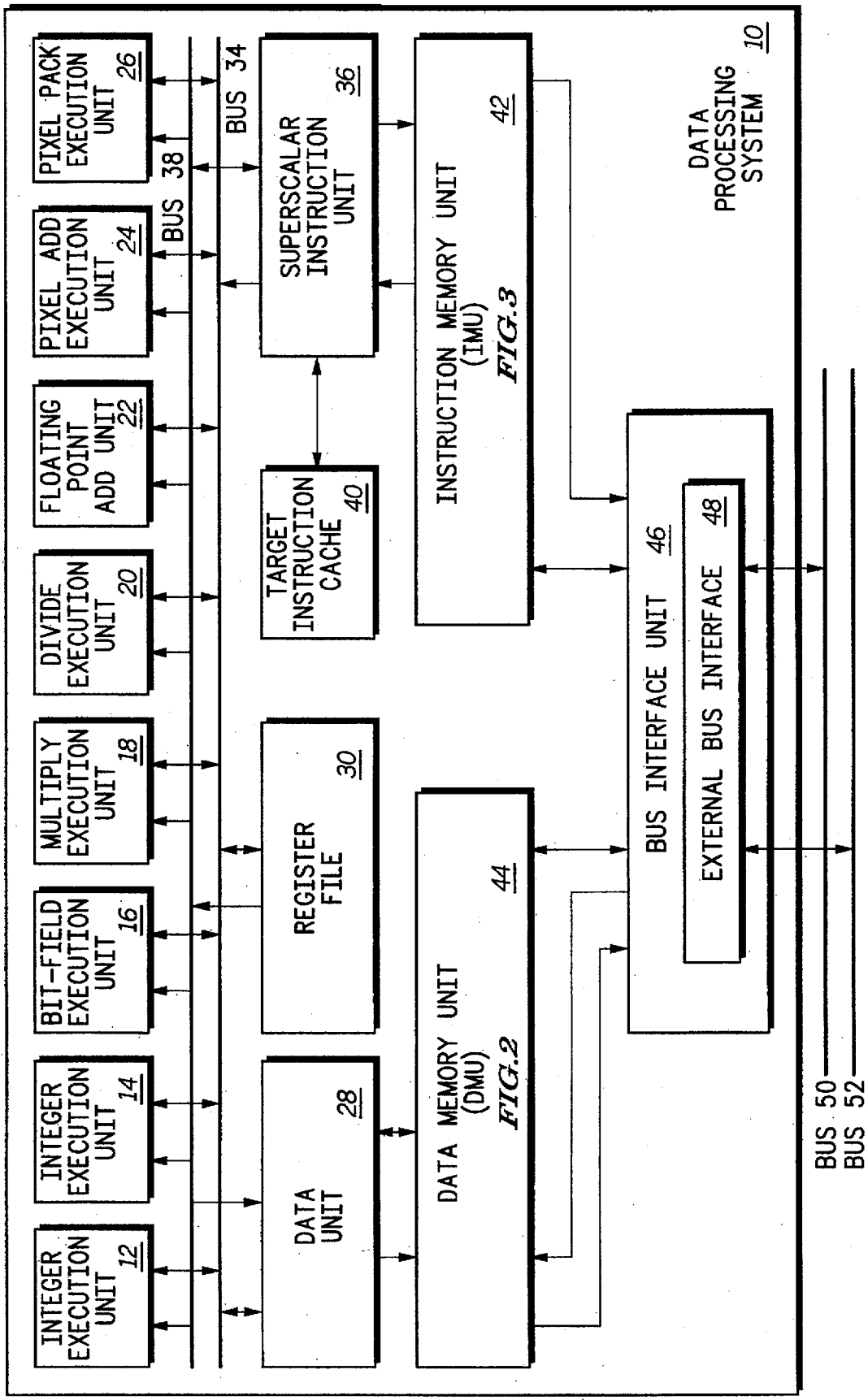
FIG. 1 illustrates, in block diagram form, a data processing system 10 in accordance with one embodiment of the present invention.

FIG. 1 illustrates a data processing system 10. Integer execution unit 12, integer execution unit 14, bit-field execution unit 16, multiply execution unit 18, divide execution unit 20, floating point add unit 22, pixel add execution unit 24, pixel pack execution unit 26, data unit 28, and register file 30 are all bi-directionally coupled to bus 34. In addition, superscalar instruction unit 36 is coupled to bus 34 in order to provide signals to bus 34.

Integer execution unit 12, integer execution unit 14, bit-field execution unit 16, multiply execution unit 18, divide execution unit 20, floating point add unit 22, pixel add execution unit 24, and pixel pack execution unit 26, and data unit 28 are all coupled to bus 38 in order to receive signals from bus 38. In addition, superscalar instruction unit 36 is bi-directionally coupled to bus 38. Register file 30 is coupled to bus 38 in order to provide signals to bus 38.

Target instruction cache 40 and instruction memory unit (IMU) 42 are each bi-directionally coupled to superscalar instruction unit 36. Data memory unit (DMU) 44 is bi-directionally coupled to data unit 28.

Instruction memory unit (IMU) 42 and data memory unit (DMU) 44 are each bi-directionally coupled to bus interface unit 46. Bus interface unit 46 has an external bus interface 48 which is bi-directionally coupled to bus 50 and to bus 52. In one embodiment of the present invention illustrated in FIG. 1, all of data processing system 10 is located on one integrated circuit, and bus 50 and bus 52 are both external to data processing system 10.

Figure 2:
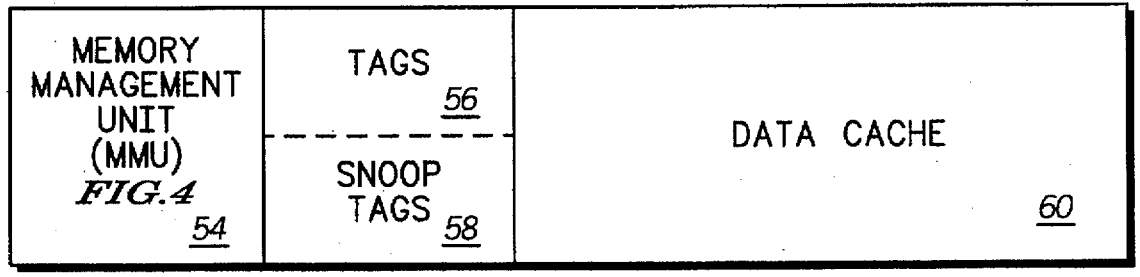
FIG. 2 illustrates, in block diagram form, a data memory unit 44 of FIG. 1 in accordance with one embodiment of the present invention.

FIG. 2 illustrates a data memory unit (DMU) circuit 44 of FIG. 1. DMU 44 includes a memory management unit (MMU) circuit 54, a tags circuit 56, a snoop tags circuit 58, and a data cache circuit 60.

Figure 3:
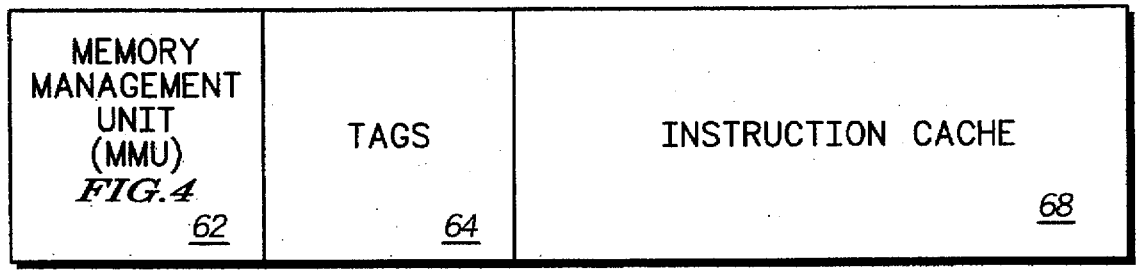
FIG. 3 illustrates, in block diagram form, an instruction memory unit 42 of FIG. 1 in accordance with one embodiment of the present invention.

FIG. 3 illustrates an instruction memory unit (IMU) circuit 42 of FIG. 1. IMU 42 includes a memory management unit (MMU) circuit 62, a tags circuit 64, and an instruction cache circuit 68.

Figure 4:
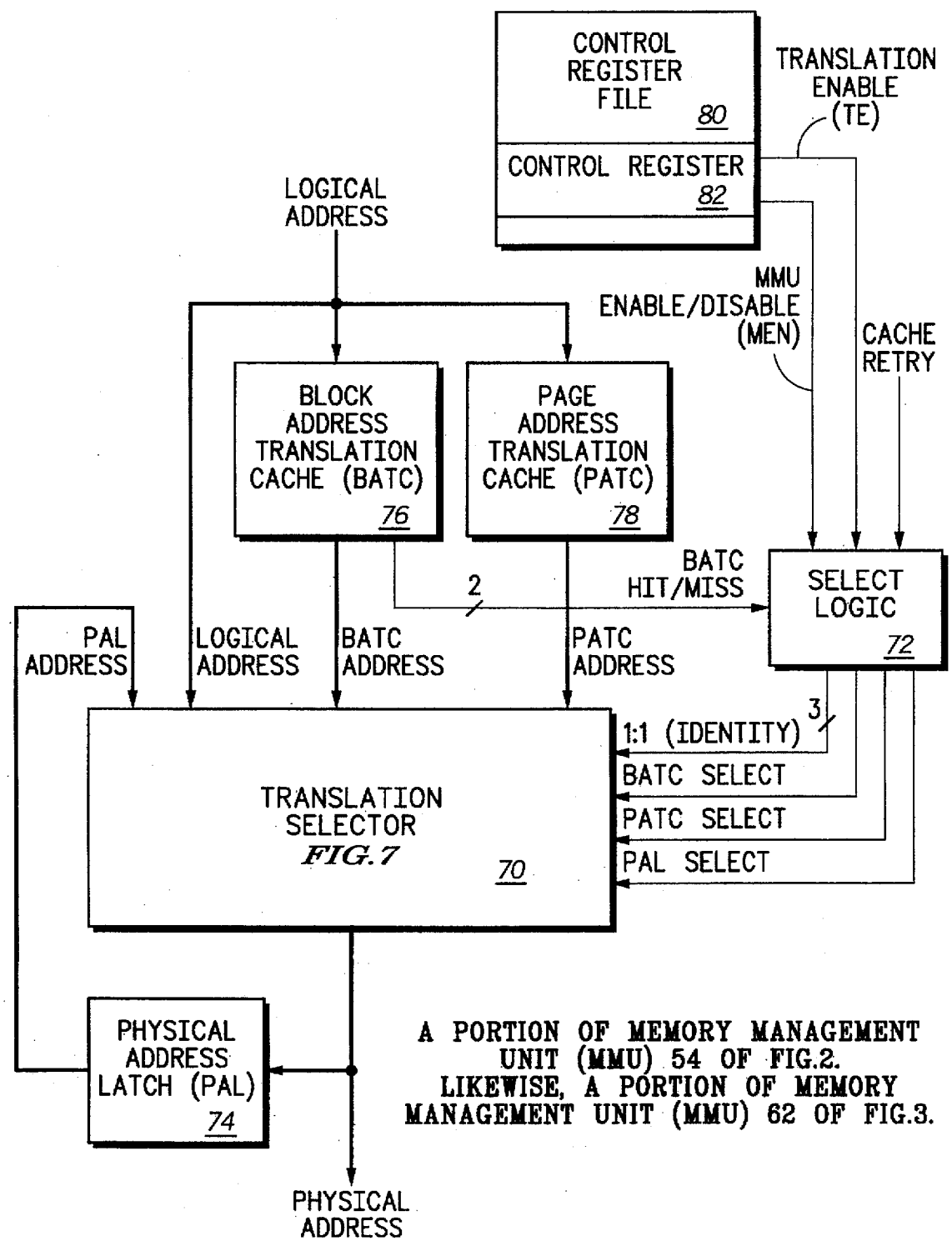
FIG. 4 illustrates, in block diagram form, a portion of memory management unit (MMU) 54 of FIG. 2, which is identical to a portion of memory management unit (MMU) 62 of FIG. 3, in accordance with one embodiment of the present invention.

FIG. 4 illustrates a portion of memory management unit (MMU) 54 of FIG. 2. Note that in one embodiment of the present invention, the portion of MMU 54 which is illustrated in FIG. 4 is identical to a portion of memory management unit (MMU) 62 of FIG. 3. In other embodiments of the present invention, FIG. 4 may illustrate a portion of only one memory management unit, or an identical portion of more than one memory management unit.

Still referring to FIG. 4, a translation selector circuit 70 receives six control signals, three 1:1 (Identity) signals, a BATC select signal, a PATC select signal, and a PAL select signal, from a select logic circuit 72. Translation selector 70 then uses these six control signals to select which one of four input address sources are used to produce the physical address which is output by translation selector 70.

Translation selector 70 receives a PAL address from physical address latch (PAL) circuit 74. Physical address latch (PAL) 74 receives as an input the physical address which is produced by translation selector 70. Translation selector 70, block address translation cache (BATC) logic 76, and page address translation cache (PATC) logic 78 each receives a logical address as an input. BATC 76 produces a BATC address which is input to translation selector 70. PATC 78 produces a PATC address which is input to translation selector 70. In one embodiment of the present invention, BATC 76 produces two BATC hit/miss signals which are input to select logic 72.

Control register file 80 has a control register 82. Control register 82 has a translation enable bit (TE) and an MMU enable/disable bit (MEN). In alternate embodiments of the present invention, the TE bit and the MEN bit may be located in the same register or in different registers. The TE bit and the MEN bit are received by the select logic 72 as inputs. Select logic 72 also receives a cache retry signal as an input.

FIG. 5 illustrates, in tabular form, four MMU address translation modes, how the modes are activated, the source of attribute bits for each mode, and the mapping for each mode in accordance with one embodiment of the present invention.

Figure 6:
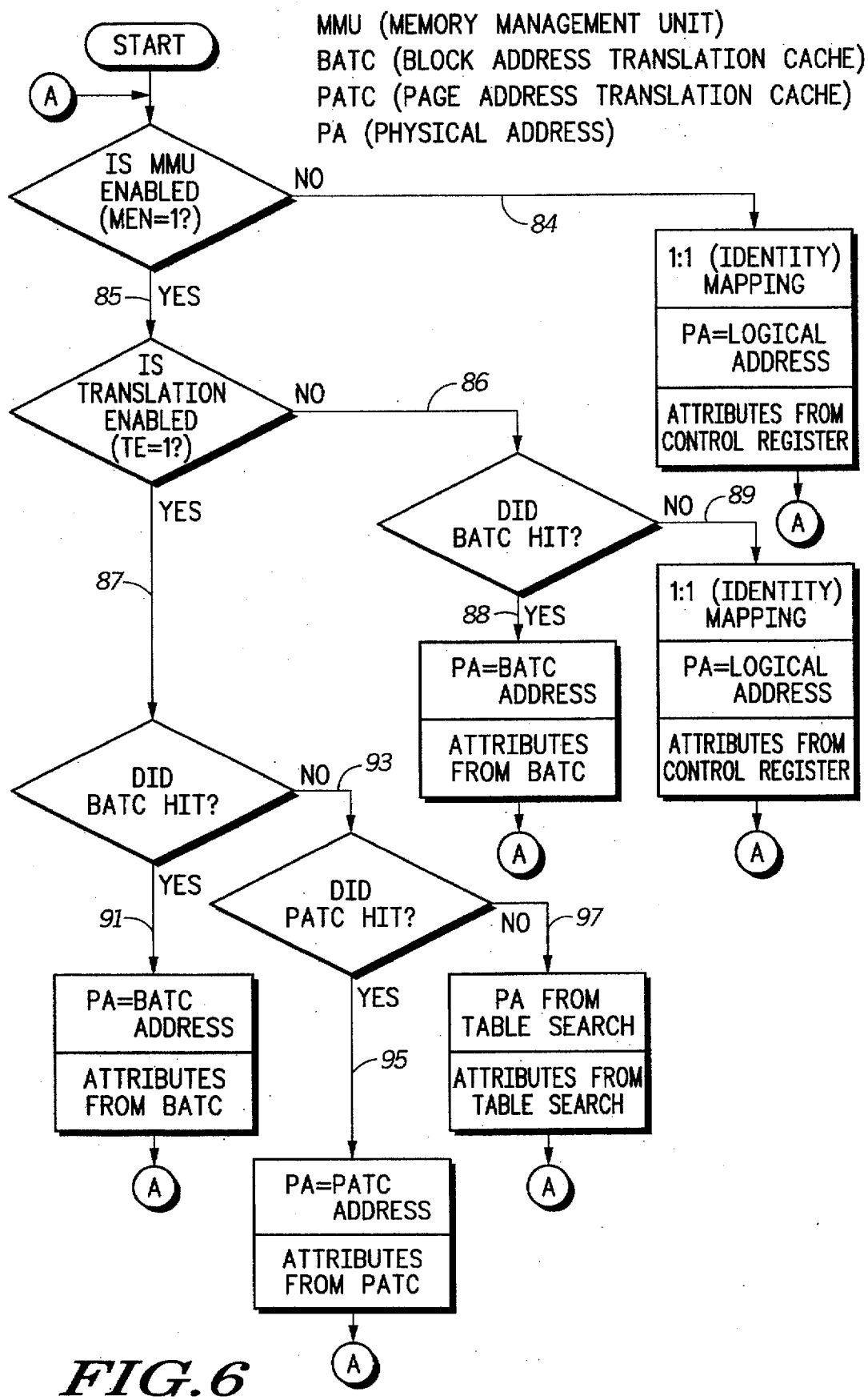
FIG. 6 illustrates, in flow chart form, a representation of the four MMU address translation modes.

FIG. 6 illustrates, in flow chart form, a representation of the four MMU address translation modes.

FIG. 7 illustrates a portion of translation selector circuit 70 of FIG. 4 in accordance with one embodiment of the present invention. The circuitry in FIG. 7 is used to perform a 4:1 multiplexing operation for only one bit of address. Thus the circuit in FIG. 7 produces only one bit of physical address. In order to produce a physical address having N bits, translation selector 70 may include N circuits such as the one illustrated in FIG. 7. The "[X]" symbol indicated one bit of a multi-bit address. For example, PATC address [X] represents one bit of the multi-bit PATC address.

Still referring to FIG. 7, a 2:1 multiplexer (MUX) 90 receives the PAL select signal as a control input, and receives PAL address [X] and logical address [X] as data inputs. MUX 90 uses the PAL select signal to select which address bit to output. NOR gate 92 receives the three 1:1 (Identity) signals as inputs. The output of NOR gate 92 is coupled to an input of NOR gate 94 and to an input of inverter 96. The output of inverter 96 is coupled to the input of NAND gate 98. The output of MUX 90 is coupled to an input of NOR gate 94 and to an input of NAND gate 98.

P-channel CMOS transistor 100 has a first current electrode coupled to a positive power supply voltage and a control electrode coupled to a precharge signal. The second current electrode of transistor 100 is coupled to a first current electrode of an N-channel CMOS transistor 102. Transistor 102 has a second current electrode coupled to ground and a control electrode coupled to the output of NOR gate 94.

P-channel CMOS transistor 104, p-channel CMOS transistor 106, and p-channel CMOS transistor 108 each have a first current electrode coupled to the positive power supply voltage. Transistors 104, 106, and 108 each have a second current electrode which is coupled to the first current electrode of transistor 102 at a node 110. A physical address [X] value is output at node 110. N-channel CMOS transistor 112 and N-channel CMOS transistor 114 each has a first current electrode coupled node 110 and a second current electrode coupled to ground.

PATC address [X] is an input to NAND gate 116 and an input to NOR gate 118. PATC select signal is an input to inverter 120 and an input to NOR gate 118. BATC address [X] is an input to NAND gate 122 and an input to NOR gate 124. BATC select signal is an input to inverter 126 and an input to NOR gate 124. The output of inverter 120 is an input to NAND gate 116. The output of inverter 126 is an input to NAND gate 122.

The output of NAND gate 116 is coupled to a control electrode of transistor 106. The output of NAND gate 122 is coupled to a control electrode of transistor 108. The output of NAND gate 98 is coupled to a control electrode of transistor 104. The output of NOR gate 118 is coupled to a control electrode of transistor 112. The output of NOR gate 124 is coupled to a control electrode of transistor 114.

OPERATION OF THE PREFERRED EMBODIMENT

The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Referring to FIG. 1, data processing system 10 has two memory units, DMU 44 which is used for data acquisition, and IMU 42 which is used for instruction acquisition. Other embodiments of the present invention may have only one memory unit, may have multiple memory units, or may have the functionality of multiple memory units combined into one complex memory unit.

Referring to FIGS. 1 and 2, DMU 44 has a memory management unit (MMU) 54 which receives logical addresses and control signals from data unit 28. Referring to FIGS. 1 and 3, IMU 42 has a memory management unit (MMU) 62 which receives logical addresses and control signals from superscalar instruction unit 36.

In one embodiment of the present invention, FIG. 4 illustrates a portion of memory management unit 54 which is identical to a portion of memory management unit 62. Note that the control register file 80 may be located anywhere in data processing system 10, as long as the control register file 80 is coupled in some manner to select logic 72. In one embodiment of the present invention, the control register file 80 is located in register file 30 of FIG. 1.

In one embodiment of the present invention, the translation enable bit (TE) and the MMU enable/disable bit (MEN) are used to help determine which address translation mode is presently selected and being used. In alternate embodiments of the present invention, other control bits could be used to help select which address translation mode is to be used. In addition, in other embodiments of the present invention, some of the address translations modes may perform different operations than the address translation modes described herein.

Select logic 72 receives four input signals and produces six output control signals as illustrated in FIG. 4. Using the four input signals, select logic 72 determines which one of the six output control signals to assert. There are three 1:1 (identity) output control signals because there are three input conditions that may produce the same 1:1 mapping. Translation selector 70 receives the six control signals from select logic 72 and uses them to control a 4:1 multiplexing operation. Translation selector 70 receives four addresses, namely PAL address, logical address, BATC address, and PATC address. Translation selector 70 then selects one of these four addresses to output as the physical address.

If one of the three 1:1 (identity) output control signals are asserted, the physical address output from translation selector 70 will be the same as the logical address received by translation selector 70. If the BATC select control signal is asserted, the physical address output from translation selector 70 will be the same as the BATC address received by translation selector 70. If the PATC select control signal is asserted, the physical address output from translation selector 70 will be the same as the PATC address received by translation selector 70. And if the PAL select control signal is asserted, the physical address output from translation selector 70 will be the same as the PAL address received by translation selector 70.

FIG. 5 illustrates characteristics of the four MMU address translation modes used in one embodiment of the present invention. The four address translations modes are listed in the first column: identity mode, BATC only mode, PATC only mode, and both PATC and BATC mode. The second and third columns indicate the logic state of the translation enable bit (TE) and the MMU enable/disable bit (MEN) for each of the four address translation modes.

The fourth column in FIG. 5 indicates whether a BATC "hit" has occurred. A BATC hit occurs when an incoming logical address is compared with the valid logical addresses stored in BATC 76, and the incoming logical address matches one of the valid logical addresses stored in BATC 76. A BATC miss occurs when an incoming logical address is compared with the valid logical addresses stored in BATC 76, and the incoming logical address does not match any of the valid logical addresses stored in BATC 76. A status bit, called a valid bit, is associated with each stored logical address in BATC 76. Each valid bit indicates whether or not its associated stored logical address is valid and thus should be compared to an incoming logical address. Note that each stored logical address in the PATC 78 also has an associated valid bit.

The fifth column in FIG. 5 illustrates the source of access protection information. This access protection information is collectively called attribute bits or attributes. The above-mentioned valid bit is an attribute bit. A supervisor/user bit which is used to indicate whether the associated logical address is in supervisor or user space is also an attribute bit.

In some embodiments of the present invention, attribute bits may be used as part of the comparison step in determining whether there is a cache hit or a cache miss. In some embodiments of the present invention, each incoming logical address has an associated incoming supervisor/user bit. The incoming supervisor/user bit is compared to the stored supervisor/user bits at the same time that the incoming logical address is compared to the valid stored logical addresses. In this embodiment of the present invention, a cache hit will only occur when the following two conditions are met: (1) the incoming logical address must match one of the stored logical addresses; and (2) the incoming supervisor/user bit must match the stored supervisor/user bit which is associated with the stored logical address that matched. In alternate embodiments of the present invention, no attribute bits or different attribute bits may be used as part of the comparison step in determining whether or not there is a cache hit.

Referring to the fifth and sixth columns in FIG. 5, the source of the attribute bits and the logical-to-physical address mapping varies depending upon the address translation mode. For example, in identity mode, the mapping is 1:1 (i.e. the physical address is the same as the logical address) and a control register is used as the source of the attribute bits. The control register can be located anywhere in data processing system 10, and in one embodiment of the present invention, may be control register 82 in FIG. 4.

In BATC only mode there are two possible mappings which may be used, depending upon whether or not there is a BATC hit. If BATC 76 indicates a hit, that means that BATC 76 contains the requisite logical-to-physical mapping. If BATC 76 indicates a hit, BATC 76 will also contain the requisite attribute bits and BATC 76 will be the source of the attribute bits. On the other hand, if BATC 76 indicates a miss, that means that BATC 76 does not contain the requisite logical-to-physical mapping. If BATC 76 indicates a miss, the mapping is 1:1 (i.e. the physical address is the same as the logical address) and a control register, for example control register 82, is used as the source of the attribute bits.

In PATC only mode, either PATC 78 contains the requisite logical-to-physical mapping and the attribute bits, or else a table search operation to more distant memory must be performed in order to retrieve the corresponding physical address and attribute bits.

In both BATC and PATC mode, either BATC 76 or PATC 78 contains the requisite logical-to-physical mapping and the attribute bits, or else a table search operation to more distant memory must be performed in order to retrieve the corresponding physical address and attribute bits.

FIG. 6 illustrates, in flow chart form, a representation of the four MMU address translation modes. If the MMU enable/disable bit (MEN) indicates that the MMU is disabled, MEN=0 in the illustrated embodiment, then the MMU will be in the identity mode and will follow the flow illustrated by path 84. If the MEN bit indicates that the MMU is enabled, MEN=1 in the illustrated embodiment, then the MMU will be in one of the other three modes and will follow the flow illustrated by path 85.

If the translation enable bit (TE) indicates that address translation is not enabled, TE=0 in the illustrated embodiment, then the MMU will be in the BATC only mode and will follow the flow illustrated by path 86. If the TE bit indicates that address translation is enabled, TE=1 in the illustrated embodiment, then the MMU will be in either PATC only mode or both BATC and PATC mode and will follow the flow illustrated by path 87.

In the BATC only mode, following the flow illustrated by path 86, there are two possible sources for the physical address and for the attribute bits. If the logical address received by BATC 76 matches one of the logical addresses stored in BATC 76, i.e. there is a BATC hit, then the MMU will follow the flow illustrated by path 88 and the physical address will be retrieved from the BATC entry which matched. Likewise, the attribute bits will be retrieved from the BATC entry which matched.

If the logical address received by BATC 76 does not match one of the logical addresses stored in BATC 76, i.e. there is a BATC miss, then the MMU will follow the flow illustrated by path 89. The path illustrated by path 89 is the same as the path illustrated by path 84. The mapping is 1:1 (i.e. the physical address is the same as the logical address) and a control register is used as the source of the attribute bits.

In prior art MMUs, a table search would be used in place of path 89 in order to determine the physical address and the attribute bits. Thus a BATC miss in BATC only mode causes the MMU to perform as if the MMU was in the identity mode. This 1:1 mapping in BATC only mode may be used in a variety of ways, thus allowing the system designer more flexibility in designing an application using data processing system 10.

The two remaining modes both follow the flow illustrated by path 87. The determination as to whether BATC 76 has hit or missed may be performed before, at the same time as, or after the determination as to whether PATC 78 has hit or missed. In some embodiments of the present invention, it may be more time efficient to perform the PATC hit/miss determination and the BATC hit/miss determination at the same time. If BATC 76 has hit, then the MMU is in the both BATC and PATC mode and the MMU will follow the flow illustrated by path 91. If BATC 76 has missed, then the MMU is either in the both BATC and PATC mode or the PATC only mode, and the MMU will follow the flow illustrated by path 93.

The both BATC and PATC mode and the PATC only mode are identical from path 93 to end point "A". If the logical address received by PATC 78 matches one of the logical addresses stored in PATC 78, i.e. there is a PATC hit, then the MMU will follow the flow illustrated by path 95 and the physical address will be retrieved from the PATC entry which matched. Likewise, the attribute bits will be retrieved from the PATC entry which matched.

If the logical address received by PATC 78 does not match one of the logical addresses stored in PATC 78, i.e. there is a PATC miss, then the MMU will follow the flow illustrated by path 97 and a table search operation will be required to retrieve the corresponding physical address and attribute bits.

SUMMARY AND SOME ALTERNATE EMBODIMENTS

In summation, the above specification describes a method and apparatus for performing address translation in a data processing system 10. In one form, the present invention has a new address translation mode, called "block address translation cache (BATC) only mode", in which a received logical address is compared to the logical addresses stored in only one of a plurality of address translation caches, i.e. BATC 76. The overhead associated with loading and comparing any other caches is not incurred.

Referring to BATC only mode, if the comparison with BATC 76 produces a hit, then BATC 76 supplies the address that is used as the physical address. However, if the comparison with BATC 76 produces a miss, then the received logical address is used as the physical address. As a result, a BATC miss in BATC only mode produces the same 1:1 mapping as is produced by choosing identity mode.

The default to 1:1 mapping may be used in a variety of ways. For example, the system designer may interleave fixed address locations which do not require address translation with mapped address location which do require address translations. The fixed address locations do not require an entry in BATC 76. Thus, the fixed address locations will always produce a BATC miss and will always default to 1:1 mapping in which the physical address is the same as the logical address. The mapped address locations, on the other hand, do require an entry in BATC 76. Thus, the mapped address locations will always produce a BATC hit in order to determine the corresponding physical address.

The present invention can be used in a wide variety of ways to improve the efficiency and flexibility of data processing systems utilizing address translation.

While the present invention has been illustrated and described with reference to specific embodiments, further modifications and improvements will occur to those skilled in the art. For example, in alternate embodiments of the present invention, any type of architecture for data processing system 10 may be used. The architecture illustrated in FIG. 1 is just one possible architecture that may be used.

Likewise, alternate structures may be used for the portion of MMU 54 and MMU 62 illustrated in FIG. 4. Although FIG. 4 illustrates two address translation caches, BATC 76 and PATC 78, alternate embodiments of the present invention may use any number of address translation caches. Likewise, alternate embodiments of the present invention may use address translation caches which are divided along boundaries other than memory blocks and memory pages.

Although the illustrated embodiment uses four MMU address translation modes, as illustrated in FIG. 5, alternate embodiments of the present invention may use more or fewer address translation modes. Alternate embodiments may also define the characteristics of some of the address translation modes differently. The flow chart representation of the four MMU address translation modes illustrated in FIG. 6 may be different.

Although the illustrated embodiment of the present invention used two control bits in a control register, namely the TE bit and the MEN bit, to help determine which address translation mode being used, alternate embodiments of the present invention may use more, fewer, or no control bits. Alternatively, the control bits may not be located in a control register.

Although FIG. 7 illustrates one possible circuit implementation of a portion of translation selector 70, other alternate circuit implementations may be used.

Although the present invention has been illustrated in the context of an address translation cache, the present invention may be used for cache operations other than address translation.

It is to be understood, therefore, that this invention is not limited to the particular forms illustrated and that it is intended in the appended claims to cover all modifications that do not depart from the spirit and scope of this invention.

We claim:

1. A method for performing a cache operation in a data processing system having a first cache, the method comprising the steps of:

receiving an incoming value as an input to the first cache;

comparing the incoming value to a plurality of first values stored in the first cache;

determining that a first cache miss has occurred if the incoming value does not match any of the plurality of first values stored in the first cache; and if the first cache miss has occurred, transmitting the incoming value as an output value, wherein the first cache is an address translation cache, the incoming value is a logical address, the plurality of first values stored in the first cache are logical addresses, and the output value is a physical address for addressing a memory without further table walking.

2. A method as in claim 1, wherein the data processing system is formed on a single integrated circuit.

3. A method as in claim 1, further comprising the step of:
   determining that a first cache hit has occurred if the incoming value matches at least one of the plurality of first values stored in the first cache.

4. A method as in claim 3, further comprising the step of:
   if the first cache hit has occurred, transmitting one of a plurality of second values stored in the first cache as the output value.

5. A method for performing address translation in a data processing system having a first cache, the method comprising the steps of:
   (A) receiving an incoming logical address as an input to the first cache;
   (B) comparing the incoming logical address to a plurality of logical addresses in the first cache;
   (C) determining that a first cache miss has occurred if the incoming logical address does not match any of the plurality of logical addresses in the first cache; and
   (D) if the first cache miss has occurred, outputting the incoming logical address as a physical address for addressing a memory without further table walking.

6. A method as in claim 5, further comprising the step of:
   (E) performing steps (A), (B), (C), and (D) of claim 5 if the data processing system is in a first one of a plurality of address translation modes.

7. A method as in claim 6, further comprising the step of:
   (F) regardless of whether the first cache miss has occurred, outputting the incoming logical address as the physical address if the data processing system is in a second one of the plurality of address translation modes.

8. A method as in claim 7, further comprising the step of:
   (G) performing the following steps when the data processing system is in a third one of the plurality of address translation modes:
      (i) receiving the incoming logical address as the input to the first cache;
      (ii) comparing the incoming logical address to the plurality of logical addresses in the first cache;
      (iii) receiving the incoming logical address as an input to a second cache; and
      (iv) comparing the incoming logical address to a plurality of logical addresses in the second cache.

9. A method as in claim 8, wherein execution of said step (ii) overlaps in time with execution of said step (iv).

10. A method as in claim 8, wherein said step (G) further comprises the step of:
    (v) indicating that a first cache miss has occurred because the incoming logical address does not match any of the plurality of logical addresses in the first cache.

11. A method as in claim 10, wherein said step (G) further comprises the step of:
    (vi) determining whether a second cache hit has occurred based upon whether the incoming logical address matches any of the plurality of logical addresses in the second cache.

12. A method as in claim 7, further comprising the step of:
    (G) performing the following steps when the data processing system is in a third one of the plurality of address translation modes:
      (i) receiving the incoming logical address as the input to the first cache;
      (ii) comparing the incoming logical address to the plurality of logical addresses in the first cache;
      (iii) receiving the incoming logical address as an input to a second cache;
      (iv) comparing the incoming logical address to a plurality of logical addresses in the second cache; and
      (v) determining whether a first cache hit has occurred based upon whether the incoming logical address matches any of the plurality of logical addresses in the first cache.

13. A method as in claim 12, wherein execution of said step (ii) overlaps with execution of said step (iv).

14. A method as in claim 12, wherein said step of performing further comprises the step of:
    (vi) if the first cache hit has occurred, outputting one of a plurality of physical addresses stored in the first cache as a physical address.

15. A method as in claim 14, wherein said step of performing further comprises the step of:
    (vii) determining whether a second cache hit has occurred based upon whether the incoming logical address matches any of the plurality of logical addresses in the second cache.

16. A method as in claim 15, wherein said step of performing further comprises the step of:
    (viii) if the second cache hit has occurred, outputting one of a plurality of physical addresses stored in the second cache as a physical address.

17. A method for performing address translation in a data processing system having a first cache and a second cache, the method comprising the steps of:
    receiving a logical address;
    determining which of a plurality of address translation modes is selected;
    if a first mode of the plurality of address translation modes is selected, performing the steps of:
      (a) comparing the received logical address to a plurality of logical addresses in the first cache;
      (b) determining that a miss has occurred if the received logical address does not match any of the plurality of logical addresses in the first cache; and
      (c) outputting the received logical address as a physical address for addressing a memory without further tablewalking if the first cache indicates that a miss has occurred; and
    if any mode other than the first mode of the plurality of address translation modes is selected, performing the steps of:
      (a) comparing the received logical address to the plurality of logical addresses in the first cache;
      (b) comparing the received logical address to the plurality of logical addresses in the second cache;
      (c) determining whether a first cache hit has occurred based upon whether the incoming logical address matches any of the plurality of logical addresses in the first cache; and
      (d) determining whether a second cache hit has occurred based upon whether the incoming logical address matches any of the plurality of logical addresses in the second cache.

18. A circuit for performing address translation in a data processing system, the circuit comprising:
    a first cache circuit for receiving a logical address, for comparing the logical address to a first plurality of logical addresses stored in said first cache circuit, and for outputting a first cache address in response to the logical address matching one of the first plurality of logical addresses;

a second cache circuit for receiving the logical address, for comparing the logical address to a second plurality of logical addresses stored in said second cache circuit, and for outputting a second cache address in response to the logical address matching one of the second plurality of logical addresses;

control means for determining which one of a plurality of address translation modes is selected, said control means having a control value; and a logic means, coupled to said first cache circuit, to said second cache circuit, and to said control means, said logic means for receiving the logical address, the first cache address, and the second cache address, said logic means for selecting, based upon the control value, which one of the logical address, the first cache address, and the second cache address to output as a physical address for addressing a memory without further tablewalking, said logic means outputting the logical address as the physical address when both the control value is a first value and the logical address does not match any of the first plurality of logical addresses.

19. The circuit for performing address translation in a data processing system according to claim 18, further comprising:

a processing unit, coupled to said first and second cache circuits, said processing unit producing the logical address.

20. The circuit for performing address translation in a data processing system according to claim 19, further comprising:

a bus coupled to said processing unit, to said first cache circuit, and to said second cache circuit, said bus for transferring the logical address to both said first and second cache circuits.

21. A circuit for performing address translation in a data processing system, the circuit comprising:

a first cache circuit for receiving a logical address, for comparing the logical address to a first plurality of logical addresses stored in said first cache circuit, and for outputting a first cache address in response to the logical address matching one of the first plurality of logical addresses;

a second cache circuit for receiving the logical address, for comparing the logical address to a second plurality of logical addresses stored in said second cache circuit, and for outputting a second cache address in response to the logical address matching one of the second plurality of logical addresses;

a storage circuit for storing a previous physical address;

a control register file for storing a control value;

a control circuit, coupled to said control register file, said control circuit determining which one of a plurality of address translation modes is selected in response to receiving the control value from said control register file;

a plurality of control signals, provided by said control circuit, said plurality of control signals having a unique logic state for each of the plurality of address translation modes; and a translation selector circuit, coupled to said first cache circuit for receiving the first cache address, coupled to said second cache circuit for receiving the second cache address, coupled to said storage circuit for receiving the previous physical address, and coupled to said control circuit for receiving said plurality of control signals, in response to receiving said plurality of control signals, said translation selector circuit selecting which one of the logical address, the first cache address, the second cache address, and the previous physical address to output as a current physical address, said translation selector circuit outputting the logical address as the current physical address for addressing a memory without further tablewalking when a first one of said plurality of address translation modes is selected and the logical address does not match any of the first plurality of logical addresses.

\* \* \* \* \*